July 26, 1932.   A. HERMAN   1,868,573
MANUFACTURE OF FURNITURE
Filed Feb. 20, 1930
FIG. 1
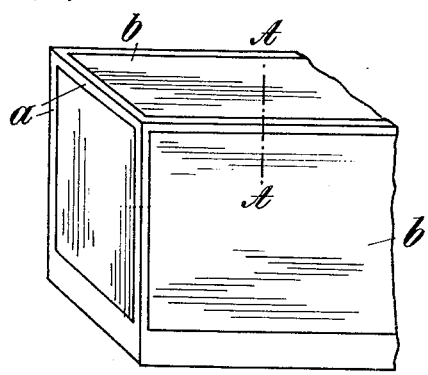
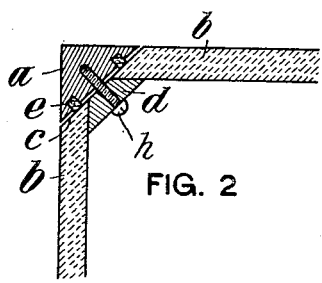
FIG. 2
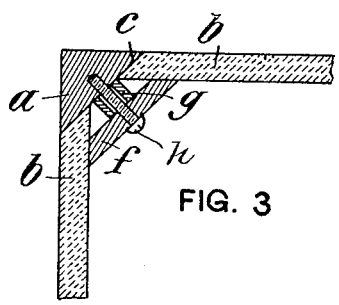
FIG. 3
Inventor:
A. Herman
By: Marks & Clerk
Attys.

Patented July 26, 1932

1,868,573

UNITED STATES PATENT OFFICE

ALEXANDER HERMAN, OF BERLIN, GERMANY

MANUFACTURE OF FURNITURE

Application filed February 20, 1930, Serial No. 430,040, and in Germany March 6, 1928.

This invention relates to built up articles of furniture constituted by glass walls which are pressed by inner corner ledges against an outer frame. The invention consists in providing the frame with oblique surfaces with which the glass walls engage by means of correspondingly bevelled edges. This has the advantage over the well known constructions in which the vertical edges of the glass plates are clamped between parallel surfaces of the frame and the corner ledges, causing the pressure of the fixing screws when they are tightened to act on the glass edges at right angles, that the frame is situated in the plane of the glass plates, that is to say it does not project, and that the pressure, on the fixing screws being tightened, acts on the plates obliquely. Owing to this, one component of the pressure will be in the plane of the glass plate and will be transmitted by the plate to the frame. The plate itself forms therefore a bearing part staying or supporting the frame against inward bending so that the frame may be made weaker. The second pressure component which is at right angles to the plane of the glass plate, is relatively small so that there is no risk of a breaking of the glass edge.

Two constructions according to the invention are illustrated by way of example in the accompanying drawing in which Figure 1 shows in perspective a box and Figure 2 is a section on line A—A of Figure 1, whereas Figure 3 is a section on line A—A with slightly modified fastening means for the glass walls.

The box is constituted by the frame $a$ and the glass plates $b$. The frame parts are constituted by triangular bars which in cross section form a rectangular isosceles triangle. With the base surface of the triangle engage the glass plates which are bevelled ($c$) at the edge. In order to keep the plates inside, between the plates is inserted a corner ledge $d$ with bevelled lateral surfaces which is connected by screws $h$ to the frame $a$. The ledge $d$ is made for instance of rubber. Packing or joints $e$ may also be inserted into the frame $a$.

In the case of larger boxes, the inner fixing ledge may be made according to Figure 3 in two parts in such a manner that a ledge $g$ is inserted between the corner ledge $f$ and the frame $a$.

I claim:—

1. A built up article of furniture comprising an outer frame having inclined surfaces, glass walls having bevelled edges bearing against the inclined surfaces of said frame, corner ledges permanently spaced from the frame, and means for drawing the ledges against the glass walls to press the bevelled edges of the latter against said frame.

2. A built up article of furniture comprising an outer frame having inclined surfaces, glass walls having bevelled edges bearing against the inclined surfaces of said frame, corner ledges permanently spaced from the frame and having bevelled portions engaging the glass walls, and means for drawing the ledges against the glass walls to press the bevelled edges of the latter against said frame.

3. A built up article of furniture comprising an outer frame having inclined surfaces, glass walls having bevelled edges bearing against the inclined surfaces of said frame, corner ledges permanently spaced from the frame, means for drawing the ledges against the glass walls to press the bevelled edges of the latter against said frame, and packing elements interposed between the inclined surfaces of the corner ledges and the bevelled edges of the glass walls.

4. A built up article of furniture comprising an outer frame, oblique interior surfaces on said frame, a glass wall with correspondingly bevelled edges, packings inserted in said frame and projecting from said oblique surfaces and means for pressing said glass wall with said bevelled edges against said oblique surfaces of said frame.

5. A box comprising a frame with oblique interior surfaces the bars of said frame having triangular cross-section, glass walls with bevelled edges in said frame and means for pressing said glass walls with said bevelled edges against said oblique surfaces of said frame.

In testimony whereof I affix my signature.

ALEXANDER HERMAN.